INVENTOR.
Charles E. Branick
BY
Merchant & Merchant
ATTORNEYS

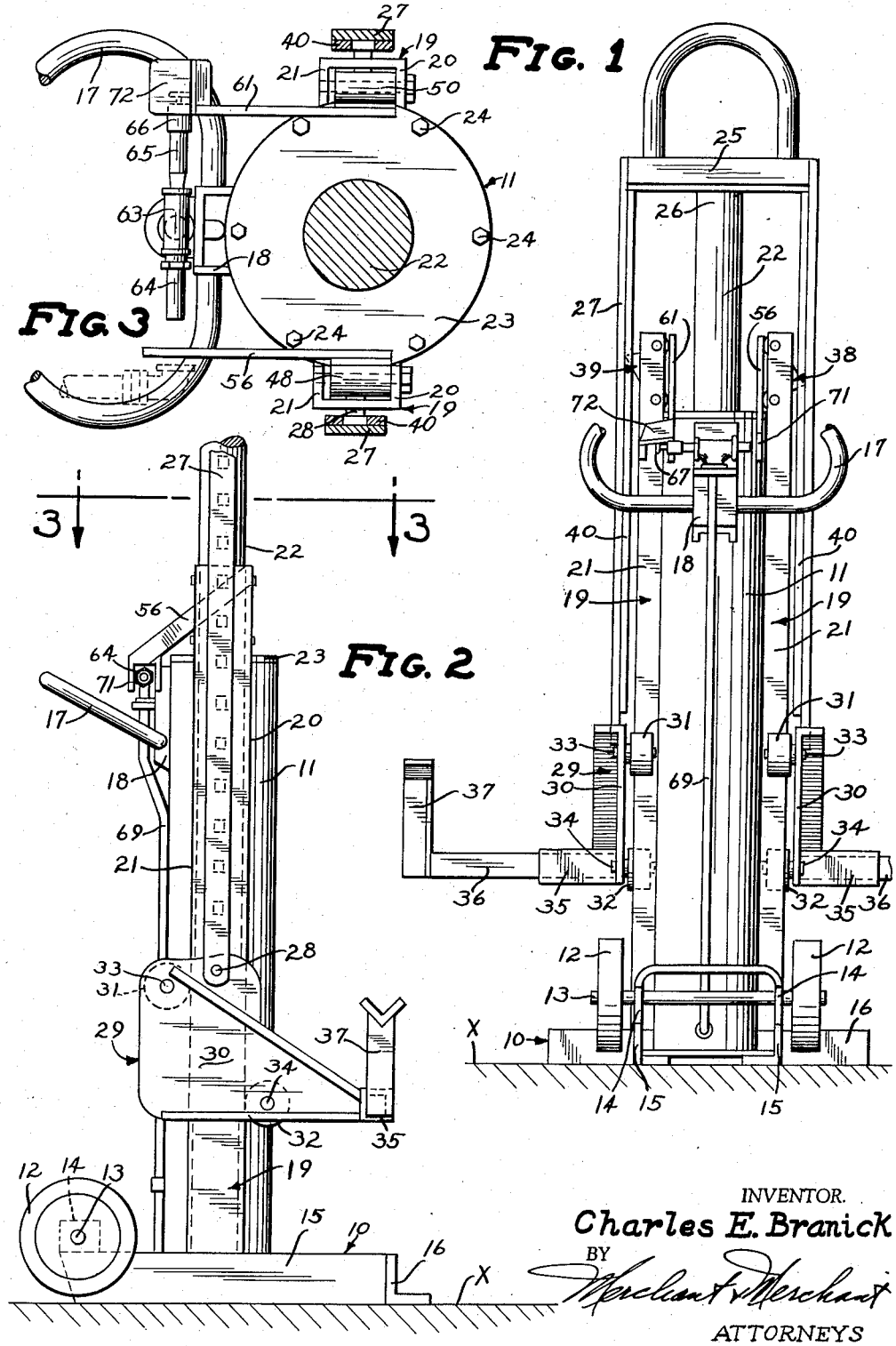
June 10, 1958 — C. E. BRANICK — 2,838,027
FLUID PRESSURE OPERATED JACK
Original Filed Dec. 28, 1954 — 2 Sheets-Sheet 1
INVENTOR.
Charles E. Branick
ATTORNEYS June 10, 1958 C. E. BRANICK 2,838,027
FLUID PRESSURE OPERATED JACK
Original Filed Dec. 28, 1954 2 Sheets-Sheet 2

United States Patent Office

2,838,027
Patented June 10, 1958

2,838,027

FLUID PRESSURE OPERATED JACK

Charles E. Branick, Fargo, N. Dak.

Original application December 28, 1954, Serial No. 478,142, now Patent No. 2,805,839, dated September 10, 1957. Divided and this application March 6, 1957, Serial No. 644,387

1 Claim. (Cl. 121—40)

My invention relates to fluid pressure operated lifting mechanisms, and more particularly to fluid pressure operated jacks for lifting automotive vehicles and the like.

More specifically my invention is a division of my co-pending allowed application, S. N. 478,142, "Fluid Pressure Operated Jack," filed December 28, 1954, now Patent No. 2,805,839.

The primary object of my invention is the provision of a fluid pressure operated jack of the type described having a latching mechanism therewith which prevents both uncontrolled lifting movements and uncontrolled lowering movements.

A further object of my invention is the provision of a device of the class described which is capable of lifting great loads and is safe and simple to operate.

A further object of my invention is the provision of a device of the class described having a pair of safety latching mechanisms associated with valve means wherein one latching mechanism and one valve means are actuated together to permit lifting movements of the device, and the other latching mechanism and another valve means are actuated together to permit lowering movements of the device.

The above and further objects and advantages of the invention will become apparent in the course of the following specification and claim, reference being had to the accompanying drawings wherein:

Fig. 1 is a view in rear elevation of my invention, with some parts broken off;

Fig. 2 is a view in side elevation, with some parts broken off, of the structure shown in Fig. 1;

Fig. 3 is an enlarged view partly in top plan and partly in section, with some parts broken off, taken on the line 3—3 of Fig. 2;

Figure 4:
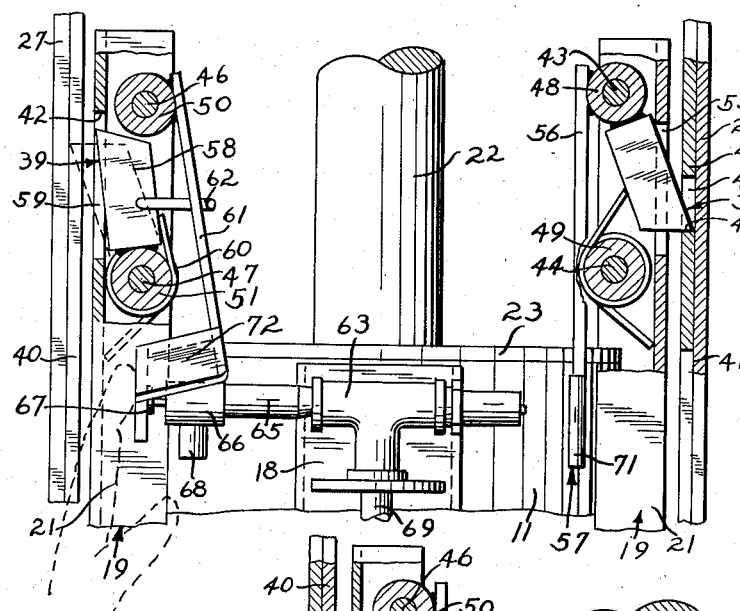
Fig. 4 is an enlarged fragmentary view in rear elevation, with some parts broken away, of a portion of the structure shown in Fig. 1.

Referring more particularly to the drawings, wherein like parts will be indicated by the same numeral, the numeral 10 indicates a mounting base having secured to its central portion a generally vertically disposed cylinder 11. A pair of wheels 12 are journaled to an axle 13 extending through oppositely disposed ears 14 on side flanges 15, which form a part of the base 10. As shown, wheels 12 are engageable with the ground X only when the forward end 16 of the base 10 is elevated by pressing downwardly and backwardly upon a handle 17 which is anchored to and projects rearwardly and upwardly from a mounting bracket 18, anchored adjacent the upper end of cylinder 11. The mounting of wheels 12, herein provided, insures the stability of my invention when it is in use with the base 10 positioned firmly on the ground X, as particularly shown in Fig. 2, and yet provides my invention to be easily portable when it is desired to move it from one position to another.

A pair of U-shaped channel members 19 are secured to diametrically opposite side portions of cylinder 11 and each define a pair of generally vertically extending parallel guide rails 20 and 21. A piston, not specifically shown in the drawings but disposed within cylinder 11 for movement therein, has a plunger rod 22 secured thereto for movement therewith. Plunger rod 22 projects outwardly, and specifically generally upwardly, through a head 23 anchored to cylinder 11 by bolts 24. It is clear that the movement of the piston within cylinder 11 in one direction will extend plunger 22 with respect to the cylinder 11 and that the movement of the piston in the other direction will contact plunger 22 with respect to cylinder 11. A crosshead 25 is secured to plunger 22 adjacent its outwardly projected end 26, and specifically is secured at the extremity of the upper end thereof, and projects laterally outwardly therefrom in opposite directions to overlie the upper ends of channel members 19. Rigidly secured to the opposite ends of crosshead 25 and depending generally vertically therefrom, adjacent channel members 19, are a pair of longitudinally extending lifting links 27. Lifting links 27 are disposed adjacent the cylinder 11 at diametrically opposed sides thereof in spaced parallel relation to its axis and are longitudinally movable with respect thereto by virtue of their connection to crosshead 25 and plunger 22. Lifting links 27 have pivotal connections at their lower ends, as indicated at 28, with carriage structure indicated in its entirety by the general reference numeral 29. It will be noted that pivotal connections 28 are intermediate the guide rails 20 and 21 formed by the channel members 19.

Carriage structure 29 comprises oppositely disposed side frame members 30, each of which carry a pair of guide rail engaging roller elements 31 and 32. Roller elements 31 are journaled on inwardly projecting stub axles 33 and are each engageable with a different one of the guide rails 21. Roller elements 32 are generally downwardly spaced and laterally offset from roller elements 31 and are journaled on stub shafts 34, each projecting inwardly from a different one of the guide rails 20. Carriage structure 29 further comprises a cross-sectionally rectangular generally horizontally disposed tubular lifting beam 35 which is anchored to and extends between the forward end portions of the side frames 30. Each end of the beam 35 projects laterally outwardly beyond the adjacent side frame member 30. A pair of longitudinally extending beam sections 36 are adjustably and slidably mounted in beam 35 in side-by-side relationship and at their extreme outer ends are preferably provided with yoke-like load-receiving heads 37.

I provide my invention with safety features comprising a one-way acting detent means releasably urged into latched relationship for preventing extending movements of plunger 22 and indicated generally by the reference numeral 38, and a one-way acting detent means releasably urged into latched relationship and preventing contracting movements of plunger 22 and indicated generally by the reference numeral 39. The purpose of detent means 38 and 39 will be subsequently brought out, and specifically they are comprised as follows: A pair of longitudinally extending ratchet bars 40 are each rigidly anchored to a different one of the links 27 and the bars having generally rectangular slots 41 cut therein to form pawl-engaging edges or teeth 42.

Channel members 19 project upwardly beyond head 23 of cylinder 11. At the upper end of one channel member 19 are disposed a pair of vertically spaced headed pins 43 and 44 which extend through guide rail 20 to be threaded through a spacer bar 45 into guide rail 21 of that channel member. Similarly disposed at the upper end of the other channel member 19 are a pair of vertically spaced headed pins 46 and 47 which extend through the guide rail 20 to be threaded through the spacer bar 45 into guide rail 22 of that channel member. Sleeves 48 and 49 are journaled on pins 43 and 44, respectively, between the guide rail 20 and spacer bar 45 at the upper end of one channel member 19, and sleeves 50 and 51 are journaled on pins 46 and 47 between guide rail 20 and spacer bar 45 at the upper end of the other channel member 19.

Referring particularly to detent means 38, a pawl 52 is rigidly secured to sleeve 48 by welding or the like in depending relationship for pivotal movement therewith on the horizontal axis defined by pin 43. Pawl 52 is pivotally swingable into and out of latching engagement with the adjacent ratchet bar 40 through a vertically extending slot 53 formed in one of the crosspieces 54 which form that part of channel members 19 extending between the guide rails 20 and 21. A torsion spring 55 carried by sleeve 49 has one end in engagement with the adjacent crosspiece 54 and its opposite end in engagement with pawl 52 to yieldingly urge pawl 52 into its latched relationship with the adjacent ratchet bar 40. An actuating arm 56 is rigidly anchored at one end by welding or the like to sleeve 48 and extends generally diagonally downward therefrom so that the free end 57 thereof is disposed adjacent bracket 18.

Referring particularly to detent means 39, a pawl 58 is rigidly secured to sleeve 51 by welding or the like and extends generally upwardly therefrom for pivotal movement with sleeve 51 on the horizontal axis defined by pin 47 into and out of latching engagement with the adjacent ratchet bar 40 through a vertically extending slot 59 formed in the crosspiece 54 of the channel member 19 with which detent 39 is associated.

Figure 6:
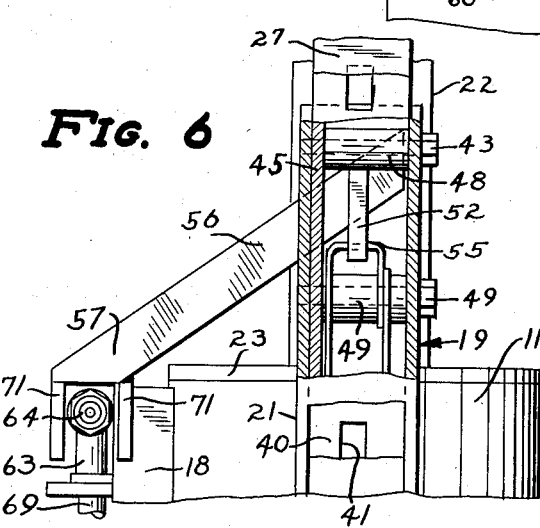
Fig. 6 is an enlarged fragmentary view in side elevation, with some parts broken away, of a portion of Fig. 2.

A torsion spring 60 similar to torsion spring 55, see particularly Fig. 6, is mounted on sleeve 51 and has one end in engagement with the adjacent crosspiece 54 and its opposite end in engagement with pawl 58 to yieldingly urge pawl 58 into its latched relationship with the ratchet bar 40 which is associated with detent means 39. An actuating arm 61 is rigidly anchored at one end by welding or the like to sleeve 50 for pivotal movements on the horizontal axis defined by pin 46 and extends generally diagonally downward therefrom.

Figure 5:
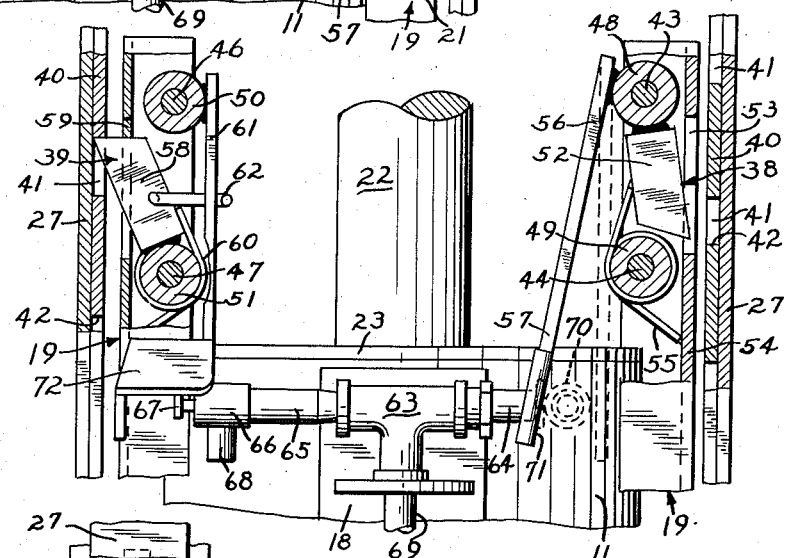
Fig. 5 is a view similar to Fig. 4 showing different positions of some of the parts thereof.

Actuating arm 61 is connected intermediate its ends to a linking member 62 which at its opposite end is connected to pawl 58 so that the pivotal movement of actuating arm 61 from its position shown in Fig. 5 to its position shown in Fig. 4 moves pawl 58 from its latched relationship with ratchet bar 40, Fig. 5, to its unlatched position, Fig. 4.

Connected to bracket 18 generally upwardly from the connection of handle 17 thereto is a T fitting 63. Connected to one end of the T 63 is a valve casing and valve, indicated by the numeral 64, the valve being of the type generally used with pneumatic tires. Connected to an oppositely disposed end of T 63 by nipple 65 is a second valve casing and valve, indicated by the numeral 66, which is actuated by push button 67 from a normally closed position to its open position. A downwardly extending conduit section 68 is connected to the casing of valve 66 to form an outlet spout and is in communication with nipple 65 through valve 66 when the latter is open. Valves 64 and 66 represent inlet and outlet valves, respectively, and are both normally biased to a closed position. Connected to the third central end of T 63 and in communication with inlet valve 64 and outlet valve 66 through T 63 is inlet and outlet conduit means 69 which extends generally vertically downwardly from T 63 to the lower end of cylinder 11 to be in communication therewith beneath the piston disposed therein.

When my invention is wheeled or otherwise placed in an operative position, wherein the yoke-like heads 37 underlie the bumper or other horizontally disposed bar-like portion of an automotive vehicle, fluid under pressure, which is preferably air, is introduced into the cylinder 11 by means of an air hose, not specifically shown but which extends from a source of fluid pressure and which terminates in a conduit head 70 to be applied to the valve casing 64. The free end 57 of actuating arm 56 is formed with a pair of depending finger-like members 71 which are positioned so that when the operator positions air conduit head 70 in engagement with valve 64, fingers 71 are first engaged by head 70 and moved therewith to be disposed on either side of the valve casing of valve 64, as particularly shown in Fig. 5. Movement of fingers 71 by head 70 and therewith actuating arm 56 moves pawl 52 from its engaged relationship shown in Fig. 4 to its released unlatched relationship shown in Fig. 5. Pawl 52 is maintained in its unlatched relationship so long as head 70 is in engagement with valve 64 because fingers 71 are prevented by head 70 from returning to the position shown in Fig. 4. As soon as head 70 is removed from valve 64, torsion spring 55 biases pawl 52 into its latched relationship with the adjacent ratchet bar 40 and engaging arm 56 and fingers 71 are returned to their normal positions shown in Fig. 4. The engagement of head 70 with valve 64 opens valve 64 and air passes through T 63 and conduit 69 to enter the bottom of cylinder 11 below the piston disposed therein, which causes the extending or upward movements of plunger rod 22 and the parts carried thereby. Under such an arrangement, pawl 58 is maintained in latched relationship during the extending movements of plunger 22 and acts as a safety mechanism to maintain the extended movement of plunger 22 and the parts carried thereby and acts to prevent any uncontrolled lowering movements of my invention. Thus, the operator is perfectly safe from any unexpected lowering movements of my invention when it is being used to lift an automotive vehicle should any sudden dissipation of the fluid pressure occur. As soon as the vehicle or other body being lifted has reached the desired raised position, head 70 is removed from inlet valve 64 to cease the inflow of fluid pressure to the cylinder 11. As previously explained, this causes pawl 52 to return to its latched position which acts to prevent further extending movements of plunger 22. This is an important safety feature which acts to prevent any danger to the operator should the automotive vehicle slip off of the yoke-like heads 37 by preventing the uncontrolled upward movement of plunger 22 which would occur when the load is removed therefrom.

Lowering movements of the plunger 22 and the parts carried thereby is effected by moving an L-shaped flange 72 fixed to the free end of actuating arm 61 into engagement with push button 67 and moving push button 67 generally inwardly to open outlet valve 66. This causes the fluid under pressure in cylinder 11 to be released through conduit 69, T 63, nipple 65, valve 66 and conduit section 68. The movement of actuating arm 61 to actuate push button 67 moves pawl 58 from its latched relationship with the adjacent ratchet bar 40, Fig. 5, to its released or unlatched relationship, Fig. 4, to permit contracting movements of plunger 22 and permit the lowering of the parts carried thereby. It is clear that as soon as plunger 22 has been contracted the desired amount, the release of flange 72 permits torsion spring 60 to again move pawl 58 into latched relationship and also releases push button 67 to permit valve 66 to return to its normally closed position and prevent further release of fluid pressure from cylinder 11.

By providing pawl 52 to be actuated together with valve 64 and pawl 58 to be actuated together with valve 66, detent means 38 and 39 are maintained in latched relationship at all times except during those periods when they must be released to permit either extending or contracting movements of the plunger, which arrangement insures utmost safety to the operator of my invention. Further, my invention insures against any improper or inopportune release of the detent means 38 or 39.

My invention has been built and tested and found to accomplish all of the afore-mentioned objectives and advantages. It will be obvious to those skilled in the art that my invention may be modified by many substitutions and equivalents and that this disclosure is intended to be illustrative only; therefore, I intend to be limited solely by the scope of the appended claim.

What I claim is:

In a fluid pressure operated lifting mechanism, a cylinder, a piston disposed within said cylinder for movement therein, a plunger secured to said piston for movement therewith and projecting outwardly through a head on said cylinder, movement of said piston in one direction extending said plunger with respect to said cylinder and movement of said piston in the opposite direction contracting said plunger with respect to said cylinder, a pair of normally closed valves, one being an inlet valve and the other being an outlet valve, fluid pressure inlet and outlet conduit means extending between said valves and said cylinder, one-way acting detent means releasably urged into latched relationship for preventing extending movements of said plunger, one-way acting detent means releasably urged into latched relationship for preventing contracting movements of said plunger, said inlet valve being adapted to removably receive the head of a conduit leading from a source of fluid pressure, engagement of said head with said inlet valve opening said inlet valve to admit piston-actuating fluid pressure into said cylinder and the removal of said head permitting said inlet valve to close, means for opening said outlet valve, and a pair of actuating arms each connected to a different one of said detent means and movable to release its latched relationship, said arms being disposed adjacent said valves and adapted to be actuated so that the arm connected to the detent preventing contracting movements of the plunger and said last mentioned means are actuated together to permit contracting movements of said plunger and the engagement of said head with said inlet valve and the actuation of the other arm are accomplished together to permit extending movements of said plunger.

References Cited in the file of this patent

UNITED STATES PATENTS

| | | |
|---|---|---|
| 859,843 | Rogers | July 9, 1907 |
| 1,223,621 | Scherenzel | Apr. 24, 1917 |